Figure 9:
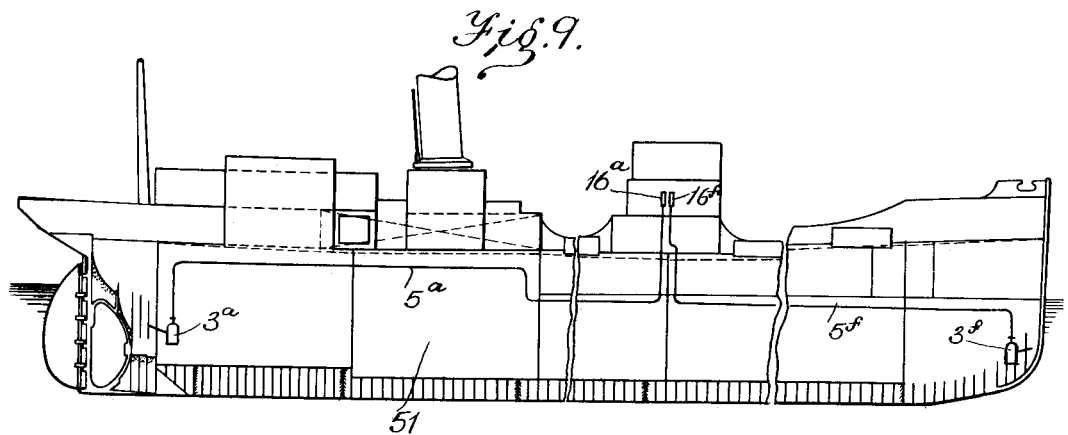

H. S. PARKS.
PNEUMATIC DEPTH INDICATOR.
APPLICATION FILED MAY 19, 1913.
1,131,412.
Patented Mar. 9, 1915.
4 SHEETS—SHEET 1.
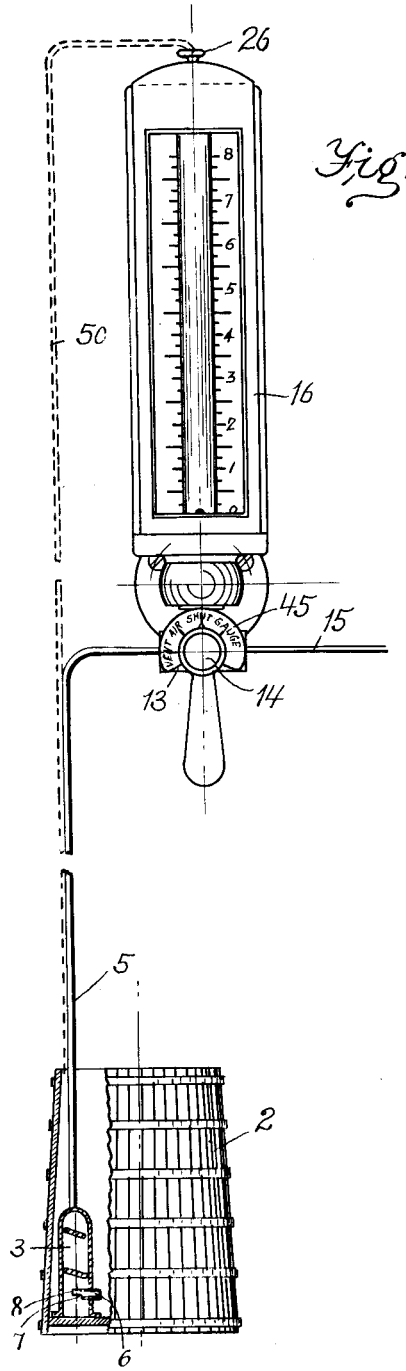
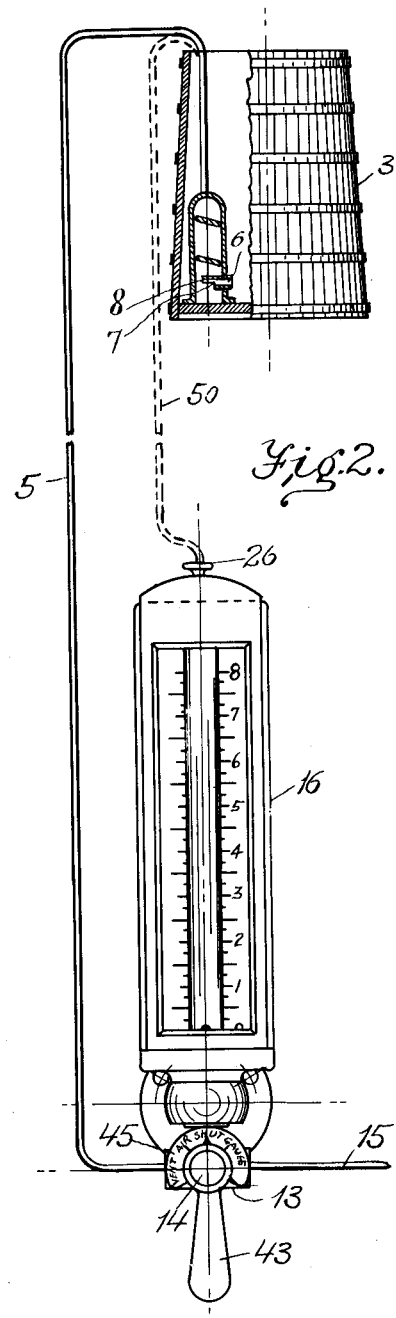
Witnesses
William H. Manton.
John Plews
Inventor
Harry S. Parks.

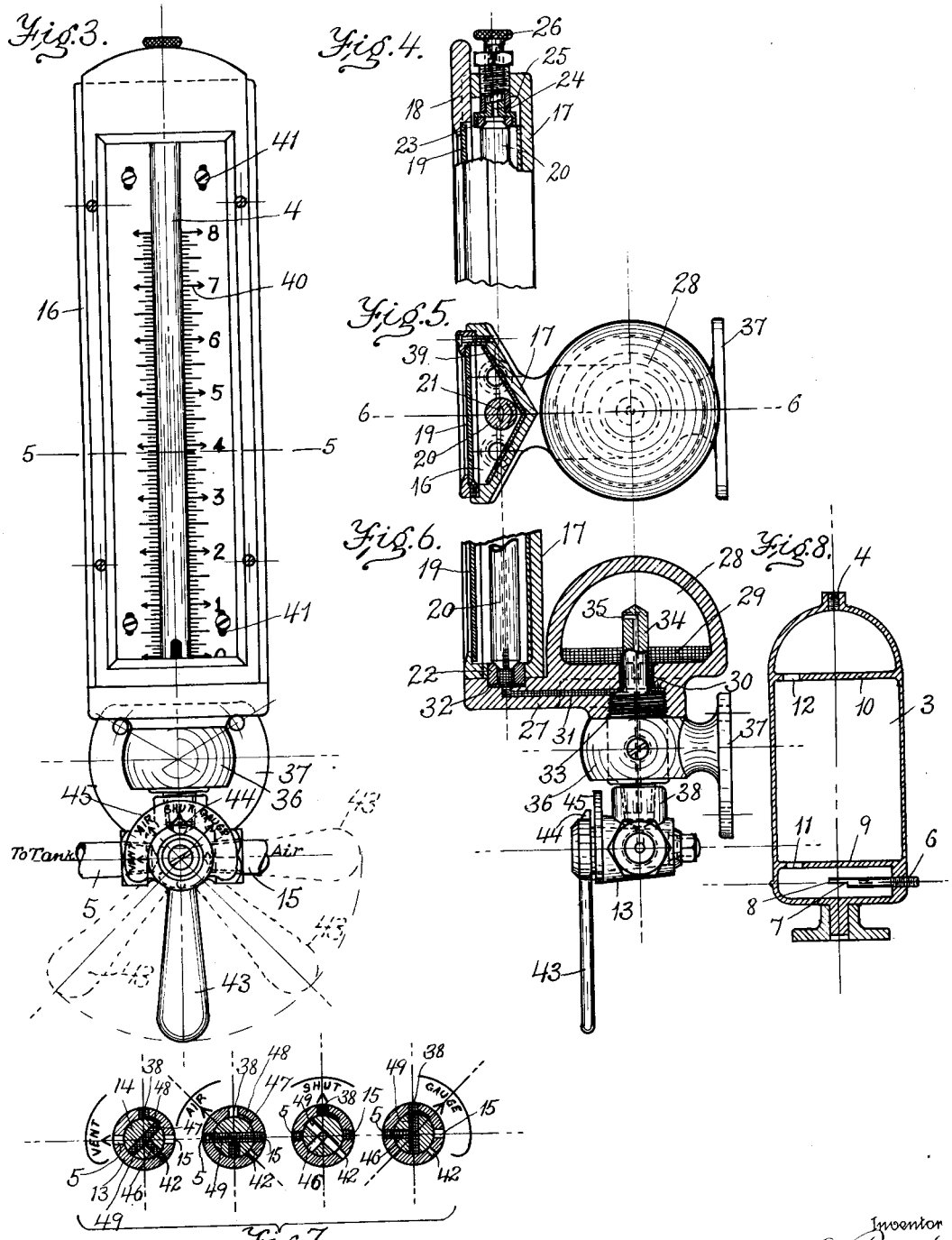

H. S. PARKS.
PNEUMATIC DEPTH INDICATOR.
APPLICATION FILED MAY 19, 1913.

1,131,412.

Patented Mar. 9, 1915.
4 SHEETS—SHEET 3.

Witnesses
D. L. Clark
E. Batchelder

Inventor
Harry S. Parks
by Wright Brown Quimby May
Attorneys

H. S. PARKS.
PNEUMATIC DEPTH INDICATOR.
APPLICATION FILED MAY 19, 1913.
1,131,412.
Patented Mar. 9, 1915.
4 SHEETS—SHEET 4.
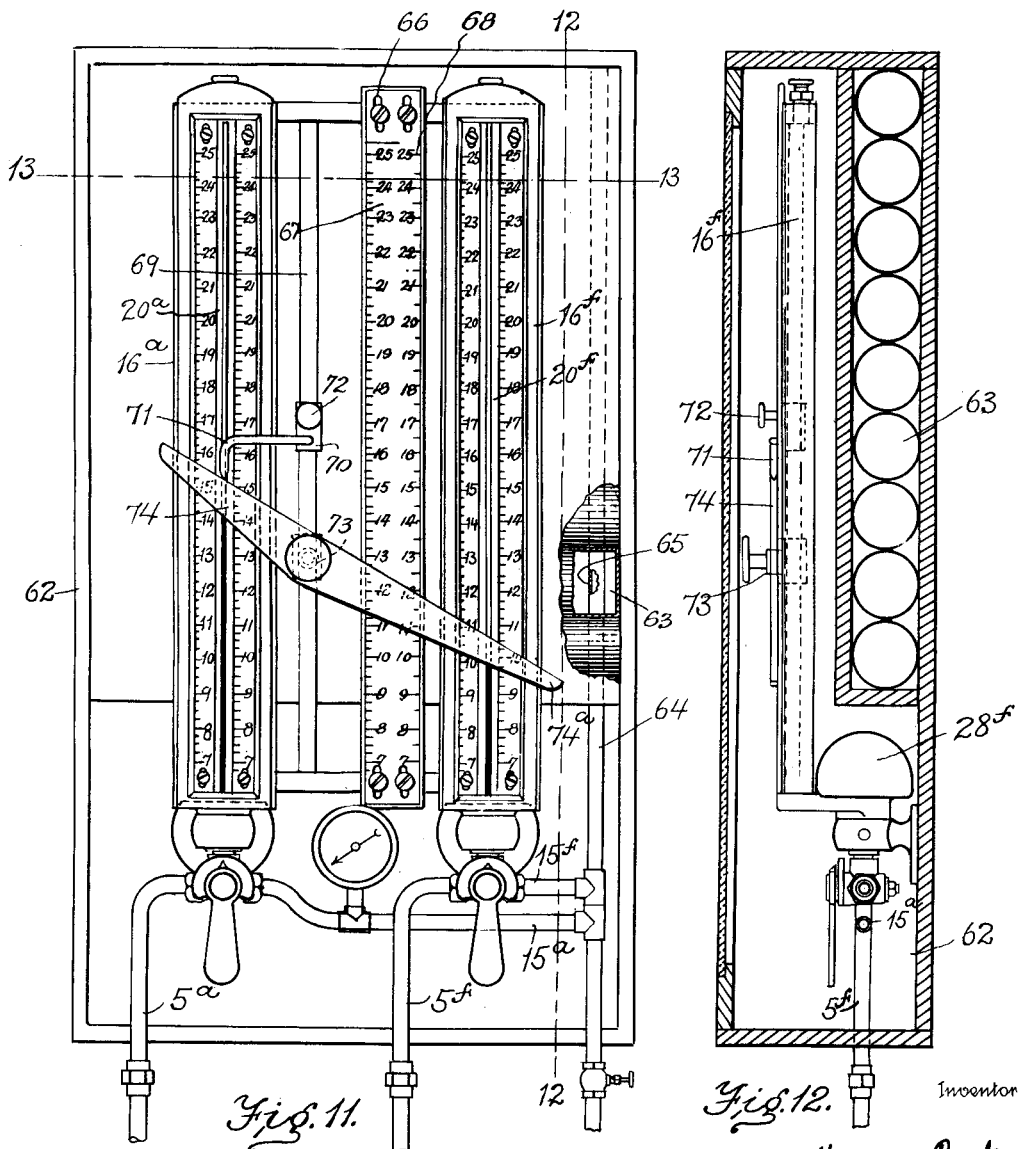
Witnesses
D. L. Clark
E. Batchelder
Inventor
Harry S. Parks
by Knight Brown Quinby May
Attorneys

UNITED STATES PATENT OFFICE.

HARRY S. PARKS, OF PHILADELPHIA, PENNSYLVANIA, ASSIGNOR TO PNÉUMERCATOR COMPANY, A CORPORATION OF MAINE.

PNEUMATIC DEPTH-INDICATOR.

1,131,412.  Specification of Letters Patent.  Patented Mar. 9, 1915.

Application filed May 19, 1913. Serial No. 768,407.

*To all whom it may concern:*

Be it known that I, HARRY S. PARKS, a citizen of the United States, and resident of Philadelphia, in the county of Philadelphia and State of Pennsylvania, have invented certain new and useful Improvements in Pneumatic Depth-Indicators, of which the following is a specification.

The present invention relates to a means or apparatus for measuring the depth of a point or location below the surface of a body of liquid, and for giving an indication of such depth at a point more or less remote from that of which the depth is desired to be known.

Among other purposes which my invention serves, may be named the following: to show automatically and by direct reading the mean draught of a ship and the displacement of the ship in units of weight; to indicate the approach of a ship to shoal water; to measure the additional draught or "squat" of the ship when under way, and generally to measure the draught of any selected part of a ship, and the trim and mean draught, whether the ship is stationary or in motion and whether the water is quiet or rough; to measure the depth of liquid in a tank and indicate such depth at a point which may be at any distance, long or short, from the tank, and above, below, or level with the tank, whether the liquid is under atmospheric pressure or a greater or less pressure; to show at a distant point the depth of water in a reservoir, pond, river, harbor, etc., and the rise and fall of the tides.

My particular object has been to produce an apparatus capable, not only of serving the foregoing purposes, but of doing so with almost absolute accuracy no matter how far distant the indicator of the apparatus may be from the point measured, and at all times, and to be independent of a reasonable amount of leakage. This object is accomplished by making the apparatus essentially of the following elements, a balancing chamber adapted to be submerged in the liquid to be measured and provided with an inlet at an exactly known point, an indicator or gage, which may be a column of mercury, water, or other fluid, or may be a spring gage equipped with a pointer, or indeed, may have any other character, and a tank or other supply, or means for supplying, pneumatic pressure; and by connecting said elements together by means of a conduit of any length and a controller so devised that the balancing chamber may be put at any time and as frequently as desired, into communication with either the indicator or the source of pneumatic pressure alone, but not with both at the same time.

The apparatus is capable of many different modes of use, and may be embodied in various forms particularly adapted to such uses. In the accompanying drawings I have illustrated two of the uses which my indicator is capable of serving, and have shown the embodiments of the apparatus which I consider especially adapted and preferable for these uses, although not with the intent of having these illustrations considered as exhaustive of all possible forms and embodiments of the invention.

Figure 10:
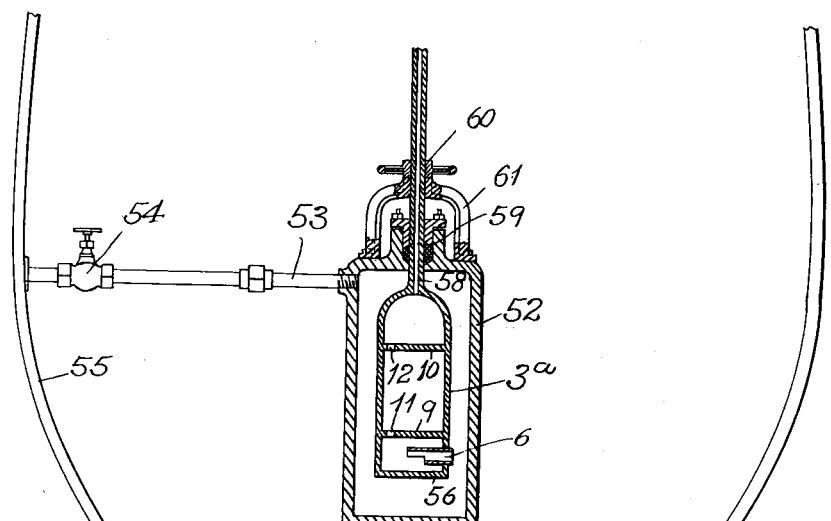

In the drawings, Figures 1 and 2 are diagrammatic illustrations showing my depth indicator applied for use in measuring the depth of liquid in a tank, showing also the adaptability of the device for operating whether the tank is above or below the indicator, the indicator being drawn to a larger scale than the tank. Figs. 3 to 8 are views showing the details of construction of one form of indicator, Fig. 3 being a front elevation, Fig. 4 a vertical central section of the upper end of the indicator, Fig. 5 being a cross section in plan view on line 5—5 of Fig. 3, Fig. 6 being a vertical section of the lower part of the indicator on line 6—6 of Fig. 5, Fig. 7 being a diagrammatic view showing the positions of the control cock and Fig. 8 being a vertical section of the balancing chamber. Fig. 9 is a diagrammatic view illustrating the application of the indicator for showing the draught of ship. Fig. 10 is a detail sectional view showing a form of balancing chamber adapted particularly for this use as well as for other uses. Fig. 11 is a front elevation of the indicator as constructed especially for showing the trim and mean draught of a ship and the dead weight of loading corresponding to such draught. Fig. 12 is a vertical section on line 12—12 of Fig. 11. Fig. 13 is a cross section on line 13—13 of Fig. 11.

The same reference characters indicate the same or similar parts in all the figures.

I will first describe the construction of the apparatus and then explain the principles according to which it operates and is used.

Referring first to Figs. 1 to 8 inclusive, 2 represents a tank adapted to contain water or any other liquid of which the depth in the tank is to be measured. 3 represents a chamber which I call for illustration a balancing chamber, and which is shown more clearly in detail in Fig. 8. This chamber is closed except for an opening 4 at its top, in which is connected the end of a pipe line 5, and an opening in its side near the bottom through which passes, and in which is secured, a tube 6 which is open from end to end and has its inner end cut substantially half away (more or less) on the under side, as shown at 7, and is provided with a transverse terminal wall 8 corresponding in outline to the cross-section of the tube above the cut away portion. The lower edge or lip of this terminal wall is located in a certain definite position in the chamber, being preferably in the vertical center line of the chamber and at a known distance from the base of the chamber 3. The cut away part of the tube forms the orifice of the tube within the chamber, through which liquid tends to enter when the external pressure exceeds the internal pressure, and air may escape when the internal pressure is the higher; and this orifice is in the lower part of the tube, being formed in its under side. The fact that the orifice is in the lower part of the tube enables the bounding edges of the orifices to determine the level of the meeting surface between the liquid and air in the balancing chamber with a high degree of exactitude, causing the level of this meeting surface to be that of the bounding edge of the orifice and neither higher nor lower than such bounding edge. I do not limit my invention to this particular form of tube however, since the particular tube described is one of several forms of inlet conduit which could be employed. The essential point is that the tube forms a conduit or passage leading into the balancing chamber and having an orifice below its highest point. Within the chamber are baffles or partitions 9 and 10, having orifices 11 and 12 respectively. There may be any number of these perforated baffles but at the present time I consider two to be a desirable number. The pipe or conduit 5 leads from the upper part of the balancing chamber to a connection with a controller which consists, in the illustrated embodiment of the invention, of a valve casing 13 in which there is a valve or cock 14 located between the point at which the pipe line 5 is connected with the casing and the point at which another pipe or tube 15 is also connected to the valve casing. The pipe line 15 is adapted to conduct air or other gas under pressure to the valve 13 and through the latter to the conduit 5 or to the indicator 16 according to the position of the valve 14.

The indicator 16 is shown in detail in Figs. 3 to 6. It includes a casing or frame 17 of which the front is covered by a removable face-plate 18 carrying a transparent pane 19 of glass or equivalent transparent material. Within the casing is an upright tube 20 having a longitudinal bore 21, shown in Fig. 5, and adapted to contain a column of mercury, water, alcohol or any other indicating fluid. For the purposes of this description, I will assume that the indicating fluid is mercury and will so refer to it hereafter. The tube 20 is removably secured by being clamped between a bottom annular seat 22, shown in Fig. 6, and an upper seat 23, shown in Fig. 4, the latter seat being carried by or formed in a tubular nipple 24 which is adjustably mounted in and passes through the upper end of the indicator casing 17 and has a bore 25 open to the outer atmosphere. The outer end of the nipple is equipped with a coupling 26 for connection with a pipe line for a purpose to be described. The ends of the mercury tube 20 are beveled and fit complementally beveled faces in their seats whereby to make tight contact. The base 27 of the indicator casing is provided with a cup 28, which is entirely inclosed and of which the upper part is approximately spherical in form. This cup contains a quantity of mercury 29 and has a passage 30 in its bottom leading to a passage 31 in said base 27, which passes under, and opens into, the cavity in the base which holds the bottom seat 22, the outlet of the passage 31 being under the opening or passage through this seat 22. Under the annular seat 22 is a disk 32 having an orifice of smaller area than the transverse area of the bore 21 in the mercury tube 20, which disk may be replaced by others having larger or smaller orifices, or may be omitted entirely if desired.

The passage 30 extends entirely through the base 27 and at its outer end is enlarged and tapped whereby said base may be securely connected with the threaded part 33 of a nozzle 34 which passes into the mercury cup and has a bore terminating in an external orifice 35, which is so placed above the mercury 29 and so separated from the walls of the cup 28 that the mercury cannot enter the nozzle in any position in which the indicator may be placed. The nozzle above the passage 31 is smaller than the opening 30 so that it passes through the latter into the mercury cup without obstructing the communication between the cup and the tube 20. The nozzle 34 is secured to a bracket 36 having a wall plate 37 by which it may be mounted in the desired location and position. The nozzle 34 passes entirely through the bracket and is connected with a branch 38 of the valve casing 13.

In the indicator casing 17 back of the mercury tube is a scale plate 39 carrying scales 40 graduated to indicate, in connection with the top of the mercury column, the depth of liquid to be measured. The scale plate may be adjustably mounted, as indicated in Fig. 3, by means of fastening screws 41 passing through slots in the plate into the back of the casing, or otherwise so that it may be adjusted longitudinally of the mercury tube for exact calibration. By describing and illustrating a separate scale plate back of the mercury tube, I do not intend to be understood as limiting the invention nor as excluding the possibility of mounting a scale in front of or beside the tube, or of having a scale etched directly on the tube.

The valve casing 13 has three branches as already indicated, to one of which is connected the tube 15 for supplying air under pressure, to another of which is connected the conduit 5, and the third of which is the branch 38 connected with the nozzle through which air is admitted to the indicator. In the diagrammatic view, Fig. 7, where the valve is shown in section, the ports which communicate with these branches are indicated by the characteristic numerals 15, 5 and 38 respectively for additional clearness. In addition, there is a fourth port 42 in the valve casing which serves as a vent.

The valve 14 is a three-way cock and is provided with a handle 43 by which it may be turned and with an indicator or pointer 44 which travels over an index plate 45 marked with indications showing the various positions in which the cock should be placed for carrying out the operations of the apparatus. These indications, in the embodiment of the invention here illustrated, are respectively "Vent," "Air," "Shut" and "Gauge," and the four corresponding positions of the cock are shown in Fig. 7. When the cock is so turned that its index is beside the point marked "Vent," the branch 46 of the cock registers with the vent 42 and another branch 47 is in communication with a channel 48 cut in the inner face of the valve casing to extend laterally a short distance from the port 38. The solid part of the cock then covers the ports 5 and 15. In this position the air space in the mercury chamber 28 is put into communication with the outer atmosphere. When in the position marked "Air," the branches 47 and 49 of the cock register with the ports 15 and 5 respectively, and the port 38 and the vent 42 are closed. In this position, communication is established between the air supply pipe and the conduit 5 leading to the balancing chamber. When the cock is in the position marked "Shut," which is that shown also in Figs. 1, 2 and 3, all three of the principal ports are covered, and, although the vent port is opened, yet no result follows from that because none of the branches of the cock open at the same time into the channel 48. When the cock is in the position marked "Gauge," the branches 46 and 49 communicate with the ports 5 and 38, the ports 15 and vent 42 being closed. Then communication is opened between the balancing chamber and the mercury cup.

The mode of use of the instrument may now be understood. The balancing chamber being submerged in the tank 2 which contains a body of liquid, the cock is first turned to the position "Air." Air from the tank or pump, or other source of pneumatic pressure, which supplies the pipe 15, flows then into the balancing chamber and expels whatever liquid there may be in the latter. The cock is held in this position long enough to insure that all of such liquid is expelled. If the pneumatic pressure exceeds the pressure due to the head of the liquid, enough air escapes through the liquid to bring the pressures into equilibrium when the valve is again shut, so that after shutting the valve a balance exists, the air pressure in the chamber and conduit being exactly balanced against the head of liquid. The level in the chamber where the air and liquid meet is established by the lower edge of the wall 8 at the inner end of the tube 6, the liquid being below this edge and the space above it being filled with air. If now the cock is brought into the position "Gauge," the compressed air is released into the mercury chamber and allowed to exert its pressure on the mercury therein, forcing the latter through the passages 30 and 31 into the tube 20, wherein it rises to a height sufficient to balance the air pressure. This height, read in connection with the scale 40, shows the depth of liquid in the tank, or gives an indication from which such depth can be readily calculated. Preferably, the scale is graduated to read directly in terms of units of depth in the tank, such as feet and inches, rather than in terms of the actual height of the mercury column.

It will be understood that the indications thus given show the depth of the lip 8 below the surface of liquid. The reason for having this lip, and otherwise giving the discharge end of the inlet tube 6 the peculiar formation described, is to establish an exactly known point in the balancing chamber, from which the depth of the liquid is measured, and to insure against error due to bubbles of air clinging to the water connection of the balancing chamber. I have found that when the communication between the inside and outside of the balancing chamber is made by a mere opening, aperture, or passage in or through the shell of the chamber, a bubble of air will usually cling to such opening. After all the air that can escape has escaped from such opening, the surface of the contact between the air and liquid is usually not in the plane established by the perimeter of the opening, but is more or less convex outwardly, to a variable and indeterminate extent; wherefor the exact depth of the lowest point in such surface below the upper level of the liquid can not be determined with sufficient accuracy for the purposes of this invention. I have, however, found also that when a tube, such as the tube 6, projecting into the chamber and having its inner orifice at its under side, is used, particularly when the edges of such orifice are sharpened, the trouble above indicated is avoided and the measuring point is established with exact and unvarying accuracy. The transverse area of the balancing chamber is made very large in comparison with the bore of the mercury tube so that the volume of liquid sufficient to fill the entire bore of said tube will occupy only an inconsiderable part of the height of the chamber. Thereby the amount of liquid which would need to enter the chamber under the external head, after the establishment of a balance between pneumatic and hydrostatic heads, as above described, in order to displace enough air to raise the mercury column to even its highest indication, will not raise the level of the liquid in the chamber through a measureable distance, but even such small amount of liquid is in practice excluded from the chamber by shifting the controller from the "Gauge" to the "Air" positions and back again as many times as may be necessary. During the shift of the controller cock from "Gauge" to "Air" the indicator column remains at the same height because the controller is so made as to prevent escape of air from the indicator; while any liquid which may have previously entered the chamber in raising the indicator is expelled when the controller reaches the "Air" position. Thus a few shifts of the controller back and forth are sufficient to expel all the liquid from the chamber, or at least all above the level of the inlet orifice, and to raise the indicator column to a height corresponding to the external head of the liquid above this level, securing theoretical as well as absolute accuracy.

Such displacement of air through the tubing, as occurs is so slight and the motion of the mercury rising to the height which balances the pneumatic pressure is so soon accomplished that almost instantly after connection is made between the balancing chamber and the indicator the pressures within the apparatus become static. Thus the friction of the fluids in the tubes and chambers has no vitiating effect and the indicator may be located at any distance, even miles away from the water container. The apparatus is thus capable of indicating the depth of water in a reservoir or in a channel of navigation located a long distance from the place where the indicators are read.

As the indication is effected through pneumatic pressure of a gas of which the weight is negligible, the indicator may be located below the body of liquid as well as above it, and will show an equal degree of accuracy in its indications. Thus, for example, the indicator is adapted for showing in the basement of a building the depth of water in a tank on the roof.

The apparatus may also be used when the liquid in the tank is under pressure greater or less than atmospheric as well as under atmospheric pressures. In cases where the pressure is other than atmospheric, the upper part of the tank is connected with the top of the mercury tube through the coupling 26 of the latter by an additional conduit 50, indicated by dotted lines in Figs. 1 and 2. In this case, both the liquid to be measured and the mercury column are exposed to the same pressure, as well as in the case where both are under atmospheric pressure.

The indicator here shown is merely one type of gage and is essentially a pressure gage, inasmuch as the indicating column is raised by pneumatic pressure. Consequently it is within the contemplation and scope of my invention to substitute other forms of gage than that in which the indicator is a fluid column,—for instance, a gage having an indicator or hand, and operated by any of the means used in pressure gages. It is also within the contemplation of my invention to make the indicator a recorder by any of the means now known and used in connection with recording pressure gages, or in any other way.

The same principles and forces are encountered whether the body of liquid to be measured is confined in a tank or is an open body of water such as exists in lakes, harbors, rivers and the sea. The apparatus is as well adapted for sounding operations in such bodies of water and for showing the rise, fall, and stage of the tides as for the purposes previously described.

Among other uses, the apparatus may be applied for showing the draught of any part of a ship, and, in this connection, a combination of two instruments is particularly useful to show the trim and mean draught, and therefrom the loaded weight, of a vessel. Fig. 9 illustrates diagrammatically the application of the invention to the last named purpose. 51 represents a vessel, and in connection with the same I have shown two indicating devices, one of them embodying a balancing chamber $3^a$, an air conduit or pipe line $5^a$ and an indicator or gage $16^a$, adapted to measure the draught at the stern,—and the other comprising a balancing chamber $3^f$, a pipe line $5^f$ and an indicator $16^f$ for measuring the draught at the bow. The balancing chambers need not be placed at a level with the keel of the ship or outside of the ship's hull provided they are located at an exactly known height with respect to the keel or to the water line of the ship. The scale of the indicator may be so marked that the distance between the keel of the ship and the balancing chamber is added to all the indication given according to the depth of submergence of the balancing chamber. The type of balancing chamber used in this connection is shown in Fig. 10. Preferably it is adjustable vertically to permit of being exactly located and to compensate for any change which may be made in the displacement of the ship. Preferably the balancing chamber is located within the skin of the ship and also within a closed water-tight case 52, from which runs a pipe 53, equipped with a sea valve 54, through the skin of the ship which is indicated at 55 in Fig. 10. The chamber $3^a$ is equivalent to and is substantially the same as the chamber 3 previously described, and may be provided with baffles 9 and 10 with orifices 11 and 12 as described, and also an inlet tube or conduit 6 having an orifice substantially as already described for establishing the level at which the balance between the water head and the pneumatic pressure occurs. The chamber is preferably mounted with capability for vertical adjustment so as to locate this level at an exactly known point in relation to the keel of the ship. For this purpose the chamber has a tubular neck 58, which passes through a stuffing box 59 in the top of the case 52 and is threaded externally to engage an adjusting nut 60 mounted on a yoke 61 which is secured to the casing 52. This provision for adjustment of the balancing chamber allows any errors made in locating the casing 52 and the sea connection to be corrected. The two indicators $16^a$ and $16^f$ are located at some convenient point, for instance the captain's office, where the captain may determine at any instant the draught of the ship both forward and aft. These indicators also constitute a means for reading directly the mean draught of the ship and thereby the loaded weight of the ship, when arranged as illustrated in detail in Figs. 11, 12 and 13. The two indicators or gages $16^a$ and $16^f$, both constructed essentially as already described, are equipped with their three-way cocks and are mounted in a box 62 which also contains air tanks 63 fed by a pipe 64 which passes through all of the tanks and has an aperture 65 in each. The air pressure may be produced by any means, even a hand air pump. From the pipe 64 lead branches $15^a$ and $15^f$ to the three-way cocks of the two indicators respectively. Midway between the indicators is a scale plate 66 having draught graduations 67 which correspond to the graduations of the scale of the two indicators. Beside the scale 67 is a dead weight scale 68 of which the graduations denote cargo weights corresponding to displacements indicated by the graduations of the mean draught scale beside the respective graduations of the dead weight scale. In practice numbers or other indications are applied to the dead weight scale beside the graduations thereof to show by direct readings the cargo weights which cause the ship to have mean draughts indicated by the respectively adjacent mean draught graduations. The dead weight scale is calculated for each individual ship and the numbers which are placed beside the mean draught numbers of course vary according to the size of the ship. Such numbers are omitted from the dead weight scale shown in Fig. 11. Mounted on the guide rod 69, which runs parallel to the scales, is a sleeve 70 carrying a pointer 71 and having a set screw 72. The pointer is carried over the front of the mercury column $20^a$ and downwardly, terminating in a point. A second slide 73 is mounted on the guide rod 69 and carries a straight-edged runner 74 below the pointer 71. After the two indicators have been manipulated, as hereinbefore described, to show the draught at bow and stern, the pointer is set with its point at the height of the column in the tube $20^a$ and there fixed. Then the slide 73 is raised until the straight-edge contacts with the end of the pointer and until the arm $74^a$, which overbalances the shorter arm of the straight-edge underlying the pointer, crosses the intersection between the center line of the tube $20^f$ and the surface of the column of mercury in the tube $20^f$. Then the point at which the straight-edge 74 crosses the scale 67 shows the mean draught of the ship. Thereby a ready and exceedingly accurate means of determining the mean draught of a ship. The graduation of the dead weight scale horizontally adjacent to the point at which the straight edge crosses the scale 67 shows the weight of the ship or of the cargo. In the apparatus illustrated in Fig. 11 the intersection of the index with the line of mean depth graduations is taken as the point from which to read horizontally across to the dead weight graduations for determining the loading of the ship. The indicating device may be manipulated at any time while a ship is being loaded or unloaded and will at once give readings from which the weight of the cargo loaded or unloaded since the last previous reading may be calculated by simple subtraction.

It will be seen that the arrangement last described combines the functions of a mean draught indicator with means for showing independently the forward and aft draught of the ship and thus the trim of the ship. Also that the draught indicator is a means for showing immediately and independently of other measurements and calculations the weight of the cargo, fuel and stores carried by the ship, and the consumption of fuel at any time. By having the scales of the indicators etched on the mercury tubes themselves and providing in addition a central longitudinal hair line on the front of the tubes, points of intersection for readings and for the location of the straight edge of the runner are provided by which the draught indications may be read accurately within a small fraction of an inch, from which the weight of the ship's load is determinable with a high degree of accuracy from the associated dead-weight scale. The instrument is independent of irregularities, such as ripples and waves, in the water surface, because the connection with the balancing chamber is submerged in still water and the result is an indication of the average depth. Moreover, the restricted orifice disk 32, previously described, overcomes variations and keeps the mercury column steady even though the pressure should fluctuate, as might be the case when the waves are high. The same indicator or a modification thereof may be used in addition to show the rate of leakage in case of collision, and to indicate instantly and accurately from time to time, when no other way of obtaining such knowledge is available, whether the pumps are gaining or losing on the in-flowing water. The instrument is useful also to give warning of the approach of the ship to shoal water. A shoal bottom causes the indicating column to act as though exposed to a fluctuating pressure, thus indicating shallow water when no other indications are observable. The instrument also measures the extra draught at the stern, or the "squat" of the ship, when under way, and thus is an aid to designing ships and in selecting propellers.

I do not intend the foregoing particular description to be taken as a limitation of the invention. It is within my contemplation and the scope of the invention to modify the apparatus and provide special construction and arrangement of the various parts thereof for special uses. Among other things, it may be mentioned that for some uses it would not be possible to employ air as the pneumatic pressure fluid, and in such cases I propose to use any other gas suitable for the particular purpose. For the purposes of this invention, any gas is a pneumatic pressure fluid and the pressures transmitted thereby are pneumatic pressures. I contemplate also modifying the indicator to employ a lighter fluid than mercury in instances where the body of liquid has a great area in comparison with its depth, as, for instance, in large but shallow tanks. Water, alcohol or even a lighter fluid may be used for such purposes and the scale of the indicator may be calibrated accordingly.

The apparatus is independent of any ordinary degree of leakage; that is, such moderate leakage as could not be practically avoided in the construction and installation of such an apparatus will not vitiate the results obtained by its use or cause the apparatus to lose its accuracy after having been installed without active use for a considerable time. A step preliminary to each use of the apparatus is the forcing of the pneumatic fluid through the pipe line and balancing chamber to expel any liquid which might have entered the latter in consequence of pneumatic leakage. Thus each use puts the apparatus in the same condition as when newly installed and without requiring the removal of the balancing chamber from the liquid or any other alteration or shifting of any part of the apparatus except the valve. After each use of the instrument, the indicator may be returned to the zero position by simply placing the cock at the "Vent" indication, whereupon the mercury chamber is put into communication with the atmosphere, and the pressure acting on the mercury column, that is on the indicating element, is made that of the atmosphere.

It should be noted that it is impossible to put the indicator in connection at the same time with both the source of pneumatic pressure and the balancing chamber, or to connect the balancing chamber with the pneumatic pressure and with the indicator at the same time; and, further, that it is possible to connect the balancing chamber with the pneumatic pressure supply at any time, whether the apparatus is installed in a ship, or elsewhere, and when the ship is in motion as well as when it is stationary. These provisions enable the instrument to be made accurate and constantly dependable. By reason thereof the instrument may be reset and independently read as many times and as frequently as desired, while the loading remains the same, and different operators may check each other's readings. Each operation fills the system with air at a pressure equal to the head of water, and no greater, ready to actuate the indicator as soon as the connection thereto is opened, and makes good any leakage that may have taken place since the last previous operation. The operation is exceedingly simple and most easily performed, being performed by the manipulation of a single valve for each indicator, at the indicator itself, and not at some remote point. The readings show directly the exact present draught of different parts of a ship, and the mean draught and displacement at any instant, or the exact depth of water or any other liquid in a reservoir, tank, etc. Finally, there is no water in the system and no danger of freezing.

I claim:

1. A depth measuring apparatus comprising an indicator or gage operable by pressure, a conduit having a connection with said indicator and also having an inlet adapted to be submerged in the liquid of which the depth is to be measured, a source of pneumatic pressure in connection with said conduit, and controlling means interposed in the connections between said inlet and said indicator and said source of pressure, said means being constructed and operable either to open communication exclusively between the source of pressure and the conduit; to open communication exclusively between the indicator and the conduit; or to close all communications at one time; said means being further constructed to prevent release of the pressure in the indicator while being changed from one to another of the above stated conditions.

2. A depth measuring apparatus comprising an indicator or gage operable by pressure, a conduit having a connection with said indicator and also having an inlet adapted to be submerged in the liquid of which the depth is to be measured, a source of pneumatic pressure in connection with said conduit, and controlling means interposed in the connections between said inlet and said indicator and said source of pressure and exposed to the pressures acting in said indicator and conduit but so mounted as to be restrained from displacement by such pressures, said means being constructed and operable either to open communication exclusively between the source of pressure and the conduit; to open communication exclusively between the indicator and the conduit; or to close all communications at one time; said means being further constructed to prevent release of the pressure in the indicator while being changed from one to another of the above stated conditions.

3. A depth measuring apparatus comprising an indicator or gage operable by pressure, a conduit having a connection with said indicator and also having an inlet adapted to be submerged in the liquid of which the depth is to be measured, a source of pneumatic pressure in connection with said conduit, and controlling means interposed in the connections between said inlet and said indicator and said source of pressure, said means being constructed and operable either to open communication exclusively between the source of pressure and the conduit; to open communication exclusively between the indicator and the conduit; or to close all communications at one time; said means being further constructed to prevent release of the pressure in the indicator while being changed from one to another of the above stated conditions and being so mounted as to be readily movable and at the same time to be retained by its mounting in any of said conditions.

4. A pneumatic depth measuring apparatus, comprising a conduit adapted to be submerged at one end in the liquid of which the depth is to be measured, a pressure indicator, a valve having three branches, one of which is connected to said conduit and another of which is connected to said indicator, and means for supplying compressed pneumatic fluid connected to the third branch, said valve including a plug mounted to oppose positive resistance to displacement by the pneumatic pressures acting upon it, and having passages arranged for connecting said supplying means with the conduit and for connecting the indicator with the conduit, and constructed to exclude all external communication while making such connections and while being shifted from one connection to the other.

5. A pneumatic depth measuring apparatus comprising a conduit adapted to be submerged at one end below the surface of a body of liquid, a pressure indicator, a container for compressed pneumatic fluid, and controlling means in connection with said conduit, indicator, and container, said means also including a vent opening to the atmosphere, and being constructed with capability for operation to make communication between the container and conduit, while shutting off the indicator and the vent, to make communication between the conduit and indicator while shutting off the container and the vent, and to make communication between the indicator and the vent while shutting off the container and the conduit; and being also operable for changing from either of the two first named communications to the other without making the third named communication.

6. In an instrument for pneumatically indicating depths in liquid and including a conduit having an outlet adapted to be submerged in the liquid, a container for pneumatic fluid under pressure, and a pressure indicator, a valve having a casing with three branches which are connected respectively to the conduit, the indicator, and the container, and with a vent to the atmosphere, said valve also including a movable element having channels so arranged that in one position of said element such channels connect the container and conduit together, in another position such channels connect the conduit and indicator together, and in a third position connect the indicator and vent together, said channels being so arranged as to permit movement of said elements between the first and second positions without making connections between the indicator and the vent.

7. In an instrument for pneumatically indicating depths in liquid and including a conduit having an outlet adapted to be submerged in the liquid, a container for pneumatic fluid under pressure, and a pressure indicator; a plural way valve connected with said conduit, indicator, and container, and having a vent to the atmosphere and including a plug arranged to turn about an axis and having passages so arranged that in one position of the plug such passages connect the conduit and container together, in a second position such passages connect the conduit and indicator together, and in a third position such passages connect the indicator and vent together, the second position being intermediate the first and third positions, whereby said plug may be turned to connect the conduit exclusively with the container and indicator respectively in either sequence, without meanwhile placing the indicator in communication with the vent.

8. An apparatus for measuring depths in liquids comprising an indicator operable by pneumatic pressure, a conduit having an inlet adapted to be submerged in the liquid, and means operable for making connection between the indicator and conduit, whereby the former will be actuated by the pneumatic pressure in the latter due to the depth of submergence of the inlet thereof in the liquid, and for venting the indicator to reset the same while the chamber inlet remains submerged.

9. A draught indicator comprising a hollow chamber having an inlet opening adapted to be submerged, a pneumatic pressure conduit leading to said chamber, a three-way valve in said conduit having a branch, and a pressure gage connected with said branch, the said valve having also a vent and being operable to connect the parts of the conduit on opposite sides of the valve, shutting off the gage; to connect the gage with the chamber side of the conduit, shutting off the pressure side of the conduit; and to connect the gage with the vent, at the same time closing both the chamber side and the pressure side of the conduit to each other and to the gage.

10. A pneumatic depth measuring apparatus comprising a chamber adapted to be submerged in a body of liquid, an inlet tube passing into said chamber and having an orifice within the chamber adapted to permit escape of pneumatic fluid under pressure, said tube being arranged to provide a channel free from liquid running from said orifice to the outer end of the tube whereby to establish the meeting surface between liquid and pneumatic fluid at a definite level, a conduit leading from a point in said chamber above said orifice, a pressure indicator connected to said conduit, and means for admitting pneumatic fluid to said conduit under sufficient pressure to blow out any liquid which may be in the chamber above the level of such orifice.

11. A pneumatic depth measuring apparatus comprising a chamber adapted to be submerged in a body of liquid, an inlet tube passing into said chamber and having an orifice within the chamber adapted to permit escape of pneumatic fluid under pressure, said orifice being located in the lower part of the tube whereby to establish the meeting surface between liquid and pneumatic fluid at a definite level, a conduit leading from a point in said chamber above said orifice, a pressure indicator connected to said conduit, a container for pneumatic fluid under pressure, and means whereby said container and said indicator may be put independently into exclusive communication with said conduit.

12. A pneumatic depth measuring apparatus comprising a chamber adapted to be submerged in the liquid of which the depth is to be measured, a conduit leading from the upper part of said chamber, an inlet conduit entering said chamber at a point below the point whence the first-named conduit leads, said inlet conduit being open outside of the chamber and having an orifice within the chamber located below the highest point of the said inlet conduit, a pressure indicator connected with said first named conduit, and means whereby compressed air may be admitted to the conduit to blow out liquid from said conduit and chamber down to the level of the said orifice.

13. A pneumatic depth measuring apparatus comprising a chamber adapted to be submerged in the liquid of which the depth is to be measured, a conduit leading from the upper part of said chamber, an inlet conduit entering said chamber at a point below the point whence the first-named conduit leads, said inlet conduit being outside of the chamber and having an orifice within the chamber located below the highest point of the said inlet conduit, a pressure indicator connected with said first named conduit, and means whereby compressed air may be admitted to the conduit without entering the pressure indicator, and whereby said pressure indicator may be put into communication with said conduit.

14. The combination of two balancing chambers, two pressure indicators arranged side by side and each having an indicating element movable in a straight path, the paths of the two indicating elements being parallel, pneumatic pressure conduits running from the indicators respectively to the balancing chambers, a mean depth scale midway between and parallel with the paths of said indicators, and an index mechanically connected with the scales and provided with parts adjacent to the indicators and mean depth scale respectively and so movable as to place those parts which are respectively adjacent to the respective indicators in registry simultaneously with both indicating elements.

15. In a depth indicator the combination of two pressure gages each including a tube in which is contained a column of liquid and a reservoir chamber for the liquid in communication with said tube, and having provisions for admitting pneumatic pressure into said reservoir chamber, the said tubes being parallel, a mean scale mounted parallel to and equidistant from both tubes, a fixed guide parallel with said tubes and mechanically connected with said scale, a pointer or stop mounted on said guide and movable along the same, having its end beside one of the tubes, a slide mounted and movable longitudinally on said guide, and an index carried by said slide on a pivot transverse both to the guide and to the length of the index, said index extending across both tubes and the scale and having one arm so located as to engage said stop when moved toward the latter.

16. An apparatus for showing the trim and mean draught of a ship, comprising, in combination with the hull of a ship, balancing chambers located near opposite ends of said hull respectively and having inlets below the water line in communication with the water in which the ship floats, pneumatic conduits leading independently from said balancing chambers, a gage for each chamber, each adapted to be put in communication with one of the conduits, the respective gages having indicators movable in parallel paths, a mean scale parallel with said indicator and an index mechanically connected with and crossing said scale and indicators, movable both longitudinally thereof and angularly about an axis transverse to the direction of such movement.

17. The combination with a ship, of a draught indicator consisting of a balancing chamber within the ship below the water line in communication with the external water, said chamber containing air and having a water inlet constructed to establish the meeting surface between the water and air within the chamber at a definite known level when the pneumatic pressure within the chamber equals or exceeds the pressure tending to force water into the chamber, a pressure indicating device, a pneumatic pressure supplying container, and means whereby said balancing chamber may be put into communication exclusively with either said indicating device or said container.

18. The combination with a ship, of a draught indicator consisting of a balancing chamber within the ship below the water line in communication with the external water, said chamber containing air and having a water inlet constructed to establish the meeting surface between the water and air within the chamber at a definite known level when the pneumatic pressure within the chamber equals or exceeds the pressure tending to force water into the chamber, a pressure indicating device, a pneumatic pressure supplying container, conduits extending from said chamber to said indicating means and said container, and means interposed in said conduits for establishing exclusive communication between the chamber and the container, whereby water may be expelled from the chamber to the aforesaid known level, and between the chamber and indicating device, whereby the latter is caused to measure the pressure head of the external water above the said level.

19. A displacement indicator for floating vessels, comprising two parallel upright indicator tubes each containing fluid in the form of an indicating column, reservoirs for such indicating fluid communicating with the respective upright tubes, conduits leading from said reservoirs to points of communication near the opposite ends of the vessel with the liquid in which the vessel floats, means for filling said conduits with gas under pressure equal to the pressure head of the liquid at the respective points of communication of said conduits, a dead weight scale between and parallel to said tubes, and indicating means mechanically connected with said scales arranged to be placed across the tubes at the upper levels of the columns therein and to intersect said dead weight scale.

20. A displacement indicator of the character described, comprising parallel upright tubes adapted to contain an indicating fluid, means for subjecting such fluid to pneumatic pressures in a manner such as to cause the columns of fluid to stand in the tubes at heights sufficient to balance such pneumatic pressures, a dead weight scale between said tubes, and indicating means mechanically connected with said scales arranged to travel along said scale and tubes, having portions arranged to lie beside the graduations on the scale and adjacent to the tubes respectively and to be placed at the height of the columns of indicating fluid therein.

21. In combination with a ship, a draught indicating apparatus comprising a casing within the ship in communication with the water outside of the ship and adapted thereby to contain water under a pressure corresponding to its depth of submergence below the surface of the outside water, a balancing chamber within said casing having a water inlet, means for adjusting said balancing chamber up and down within said casing to bring its water inlet to a predetermined position, a pneumatic fluid conduit connected with said balancing chamber, a pressure indicator, and means for putting said conduit in connection with a supply of pneumatic fluid and in connection with said indicator respectively.

22. In a depth indicating apparatus, the combination of a balancing chamber having a liquid inlet and a pneumatic fluid connection, an inclosing casing communicating with the liquid of which the depth is to be measured and in which said balancing chamber is contained, and adjusting means for regulating the position of said chamber in said casing.

23. In a depth indicating apparatus the combination of a balancing chamber having a liquid inlet, a casing in which the chamber is contained, and having a packed opening, said chamber having a tubular neck passing through the packed opening in said casing and being threaded, and a nut mounted on said casing engaging the threads of said neck and operable to adjust the chamber within the casing.

24. In a depth measuring apparatus, a balancing chamber, a tube passing through the side of said chamber in the interior thereof, the under side of the tube at its end being cut away, and the upper portion of the tube having an end wall, said end wall having a definite position in the interior of the chamber.

25. In a depth indicating apparatus, a pressure indicator having a pneumatic fluid admitting chamber, a nozzle for pneumatic pressure entering said chamber, a branched valve having one of its branches connected to said nozzle and having two other branches and a vent, and a valve plug or cock forming a part of said valve and having communicating passages so spaced and arranged with respect to the valve branches as to be able to place any two of such branches into communication while closing the third branch and also to place the gage branch in communication with the vent while closing the other branches.

26. In a depth indicating apparatus a balancing chamber having an inlet in its lower part for the liquid of which the depth is to be measured, and having an opening in its upper part adapted to be connected with a conduit for pneumatic fluid, and having between said inlet and opening one or more perforated baffles.

27. A depth measuring apparatus comprising an indicator of the column type including a chamber containing liquid, and an upright tube in communication with such chamber and having an orifice at its upper end; a conduit having an inlet adapted to be submerged in the liquid of which the depth is to be measured, and having a connection with the chamber of said indicator for transmitting compressed air thereto, a container for compressed air in connection with said conduit, and means interposed between said indicator and said inlet and between said container and said inlet, having such construction as to be operable to close the communication from the conduit to the chamber of the indicator, at the same time opening the communication from the container to the conduit; and reversely to close the communication with the container while opening that from the conduit to said chamber, whereby to permit admission to the conduit of air under sufficient pressure to quickly expel liquid from the conduit, without liability of blowing the indicating liquid out of the indicator, said means being constructed to prevent escape of compressed air from the indicator chamber when being operated to connect the container with the conduit.

28. In a depth measuring instrument an indicator of the column type comprising a rising tube and a chamber, in communication at their lower parts, containing an indicating liquid, and a conduit having an inlet adapted to be submerged in the liquid of which the depth is to be measured and said conduit being also arranged to be put in communication with the said indicator, whereby a body of air or other gas in said conduit is enabled to transmit the pressure of the liquid to the indicator; said tube having an orifice at its upper end and having provisions for connecting said orifice with a second conduit.

29. A depth measuring apparatus comprising an indicator or gage operable by pressure, a conduit having a connection with said indicator and also having an inlet adapted to be submerged in the liquid of which the depth is to be measured, a source of pneumatic pressure in connection with said conduit, and control means mounted rotatably across the channels of communication between said indicator and said conduit and said source of pressure, so as to be incapable of displacement by differences in the pneumatic pressures to which it is exposed, and so constructed as, when placed in various positions by rotation, respectively to make exclusive communication between the conduit and the source of pressure, to make exclusive communication between the indicator and the conduit, or to close all said channels of communication, and being also constructed and arranged to prevent release to the atmosphere of the pressure in the indicator when in any of such positions and when being moved from any one to any other of such positions.

In testimony whereof I have affixed my signature, in presence of two witnesses.

HARRY S. PARKS.

Witnesses:
WILLIAM H. MANTON,
F. A. ATTENEDER.